United States Patent
Bluvband et al.

(10) Patent No.: US 9,336,241 B2
(45) Date of Patent: May 10, 2016

(54) METHOD AND SYSTEM FOR IMAGE SEARCH

(71) Applicant: A.L.D Software LTD, Tel Aviv (IL)

(72) Inventors: Zigmund Bluvband, Rishon LeZion (IL); Sergey Porotsky, Yehud (IL); Alexander Dubinsky, Kfar Yona (IL)

(73) Assignee: A.L.D SOFTWARE LTD, Tel-Aviv (IL)

( * ) Notice: Subject to any disclaimer, the term of this patent is extended or adjusted under 35 U.S.C. 154(b) by 0 days.

(21) Appl. No.: 14/025,075

(22) Filed: Sep. 12, 2013

(65) Prior Publication Data

US 2014/0012880 A1    Jan. 9, 2014

Related U.S. Application Data

(63) Continuation-in-part of application No. 13/389,188, filed as application No. PCT/IL2010/000634 on Aug. 5, 2010, now abandoned.

(60) Provisional application No. 61/273,652, filed on Aug. 6, 2009.

(51) Int. Cl.
*G06F 17/30* (2006.01)

(52) U.S. Cl.
CPC .............................. *G06F 17/30268* (2013.01)

(58) Field of Classification Search
None
See application file for complete search history.

(56) References Cited

U.S. PATENT DOCUMENTS

| | | | | |
|---|---|---|---|---|
| 5,579,471 | A * | 11/1996 | Barber et al. | 715/700 |
| 2005/0086223 | A1* | 4/2005 | Rui | 707/5 |
| 2006/0120627 | A1 | 6/2006 | Shiiyama et al. | |
| 2006/0153456 | A1 | 7/2006 | Foote | |
| 2006/0227992 | A1 | 10/2006 | Rathus et al. | |
| 2006/0280427 | A1 | 12/2006 | Snowdon et al. | |
| 2007/0286531 | A1* | 12/2007 | Fu et al. | 382/305 |
| 2008/0212899 | A1 | 9/2008 | Gokturk et al. | |
| 2009/0254539 | A1 | 10/2009 | Wen et al. | |
| 2009/0313239 | A1 | 12/2009 | Wen et al. | |

OTHER PUBLICATIONS

International Search Report of Application No. PCT/IL10/00634 mailed on Dec. 16, 2010.

* cited by examiner

*Primary Examiner* — Robert Beausoliel, Jr.
*Assistant Examiner* — Hau H Hoang
(74) *Attorney, Agent, or Firm* — Pearl Cohen Zedek Latzer Baratz LLP

(57) ABSTRACT

A method and system for image search, the method comprising: receiving an indication regarding at least one feature of at least one image from a collection of images; creating an updated search algorithm according to the indication; and providing an updated collection of images by using the updated search algorithm.

11 Claims, 3 Drawing Sheets

METHOD AND SYSTEM FOR IMAGE SEARCH

CROSS REFERENCE TO RELATED APPLICATIONS

This application is Continuation-in-part (CIP) of U.S. patent application Ser. No. 13/389,188, filed on Mar. 12, 2012, published as US Patent Application Publication No. US-2012/0158784, which is a National Phase Application of PCT International Application No. PCT/IL2010/000634, International Filing Date Aug. 5, 2010, entitled A Method and System for Image Search, published on Feb. 10, 2011 as International Patent Application Publication No. WO 2011/016039, claiming priority of U.S. Provisional Patent Application No. 61/273,652, filed Aug. 6, 2009, each of which is incorporated herein by reference in its entirety.

BACKGROUND OF THE INVENTION

With the rapid growth of the internet and the users of the internet over the past ten years, and the rapid increase in the amount of information available over the internet, a need for special tools for data/text/image/sequence of images/sounds search was developed. Many search engines are available to users and provide powerful tools for image search. Search engines propose different strategies from one another in attempting to find images which are most relevant to the user-specified search criteria. For example, one can define size of image (any size, extra-large, large, medium, small), type of image (any type, news, face, clipart, line drawings, photo), color (all colors, red, green, black, etc.).

Most of the known image search engines attempt to receive relevant documents by filtering, wherein an interface is provided to allow the user to set parameters to arrive at a set of relevant documents.

Some web-based search engines use data mining capabilities. Such capabilities may include clustering of images to groups by similar topics, which enables a search for the "nearest" results or for "similar" images. The clustering procedure may employ a group-average-linkage technique to determine relative affinity between documents. Additionally, clustering procedures may take into account behavior of similar users in the past. These clustering procedures usually use off-line "profile-oriented" or "history-oriented" learning systems. Additionally, some of these systems perform image search based on corresponding text label associated with each image.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
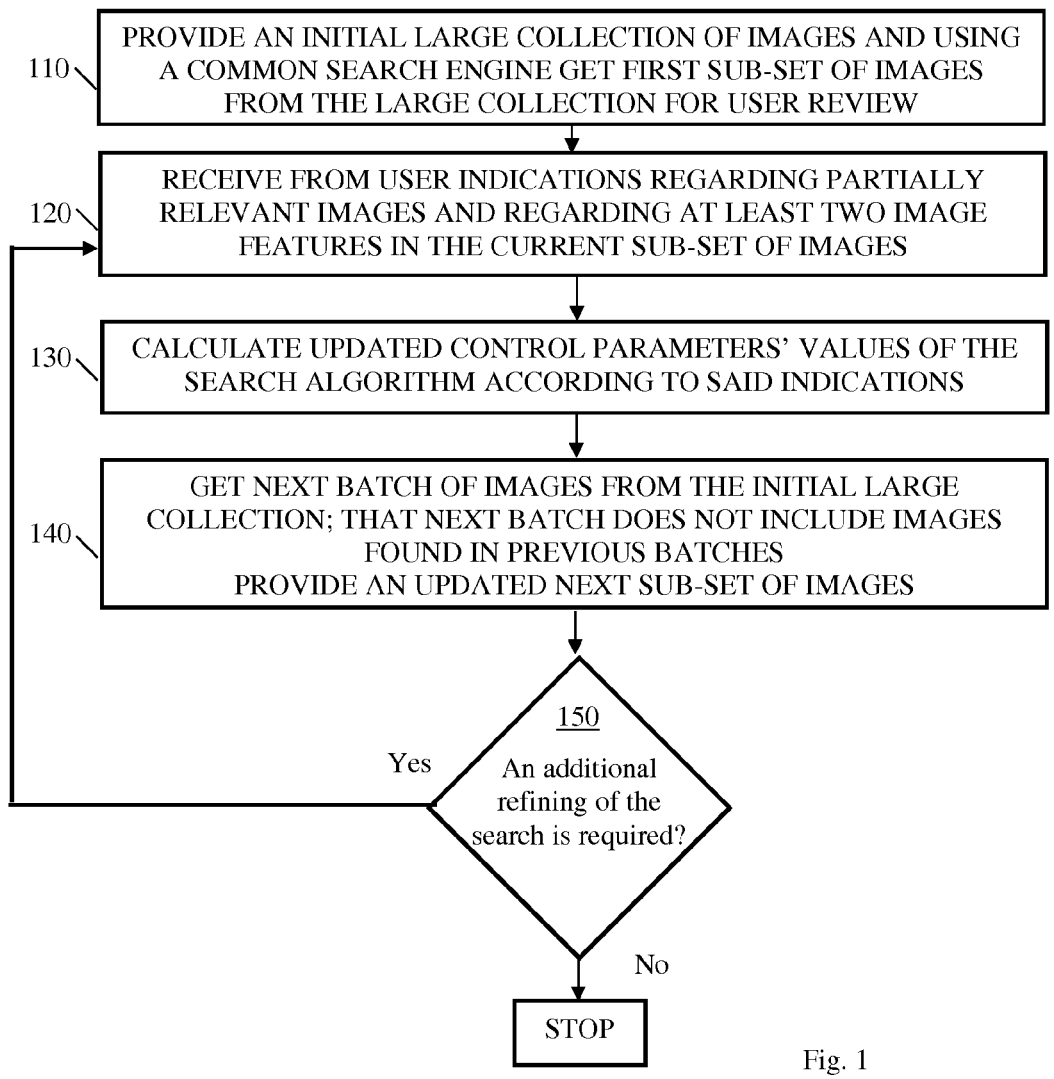
FIG. 1 is a flow-chart illustrating a method for image search according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The large volume of data available over the internet may cause an undesirable result in many of the known image search engines. Many of the simple searches may return large number of images, many of which may be not useful or not relevant to what the user is seeking. On the other hand, if a user defines his request in an extremely detailed manner (e.g., including years, country, type of information, etc.), the system may return a relatively small number of found (not necessary relevant) documents, but some important documents may be omitted.

Another drawback of known search engine systems is that they do not enable feedback from the user about the extent of success (or lack of success) of searches which were performed earlier and to use this information for further "more thorough" search.

As mentioned above, some web-based search engines use clustering of images to groups by similar topics, which enables a search for the "nearest" results or for "similar" images. These clustering procedures may take into account behavior of similar users in the past, but they don't enable taking into account on-line, dynamic profile of the actual specific user.

Additionally, the known image search engines classify the images by text labels associated with each image and not based on features within the images Embodiments of the present invention may provide a method and system for image search engine which may overcome at least some of the major limitations of the known image search engines. The method and system for image search engine according to embodiments of the present invention may be able to apply on-line learning procedures, for example, based on a given user input and/or requests, for improving search and classification results.

The method and system for image search engine according to embodiments of the present invention may utilize multi-stage procedure for step-by-step convergence of the search results to a set of the closest search results according to the user's requirements.

Reference is now made to FIG. 1, which is a flow-chart illustrating a method for image search according to embodiments of the present invention. As shown in block 110, the method may include providing a collection of images. In some embodiments of the present invention, the collection of images may be provided in response to an initial search inquiry received by a search system. The initial search inquiry which may be entered, for example, by a user. The initial search inquiry may be any kind of text search known in the art. For example, the user may enter any search term or combination of terms in attempt to define the desired items that should be searched for. Accordingly the provided collection of images may correspond to a search inquiry entered by a user. The result of the first search inquiry provides a first sub-set of images, The provided collection of images may include a very large number of images, which may be, in some cases, too many to enable reviewing of all of them by the user, moreover, some or most of the images provided may be non-relevant to the user. Therefore, a refining of the search may be required by the user. As shown in block 120, the method may include receiving an indication, for example, from a user, regarding at least one image and optionally regarding at least two features of at least one image from the provided sub-set of images. For example, a user may indicate the level of relevancy/suitability of at least one of the images or at least one feature of the images. For example, a user may indicate the level of relevancy/suitability for an image by means of binary indication, for example, yes/no or relevant/ irrelevant, or by means of multilevel ranking of relevancy/ suitability (for example, very relevant, somewhat relevant, irrelevant) or scoring.

In another example, the user may identify an image feature as a requested/desired feature or as a feature that closely suits the goals of the search. For example, the user may identify a certain item/shape and/or a certain color and/or spectrum of colors appearing in an image. For example, the user may mark an image or a portion of an image as including a desired item and/or shape and/or color/color spectrum for a next stage of the search. For the identification of image features, the user may use graphical identification means, such as various predefined functional markers which may be used on the images. For example, a certain kind of marker may be used for identifying a desired color. Another kind of marker, for example, may be used for identifying an image or a portion of an image which includes a desired spectrum of colors. Another kind of marker, for example, may be used for identifying an image or a portion of an image which includes a desired shape and/or item. Additionally, different predefined markers may be used to indicate that a similar feature is requested or that an identical feature only is requested exclusively. Other kinds of markers for various kinds of identifications may be used. The indications may be used for refining the search as described in detail herein below.

As shown in block 130, the method for image search according to embodiments of the present invention may include creating, according to the received indication from a user, an updated search algorithm which may enable search for images which include at least one of similar and identical features compared to the features indicated by the user. For example, search categorization functions may be created and added to the updated search algorithm, which may enable image search and categorization into at least two groups: suitable/non-suitable, based on the content of the images and thus, for example, obtaining an updated collection of images based on the user indication of desired image features. The creation of an updated search algorithm may include creation of an algorithm's control parameters such as threshold, for example, to be implemented by the algorithm, to distinguish between suitable and non-suitable images/features, for example, based on a required similarity level indicated by the user. In some embodiments, the user may be able to indicate for different marked features the required similarity level for each of them.

As shown in block 140, the method for image search according to embodiments of the present invention may include providing an additional batch of images from said large collection of image. The additional batch of images does not include images found in previous batches of images. The additional batch is searched using the updated search algorithm of block 130 to provide next sub-set of images.

As shown in decision block 150, in case the user is satisfied with the updated sub-set of images included in that next batch the process may stop here. In case an additional refining of the search is required, the user may further mark images from the new batch, and the method may repeat from block 120 to block 140 until an additional refining of the search is not required by the user.

Embodiments of the present invention may allow a user to search for images which include a specific visual feature or a combination of visual features marked at one image or at different images. In some embodiments, the search may be in accordance with a predefined required level of similarity to the initially indicated feature(s).

Figure 2:
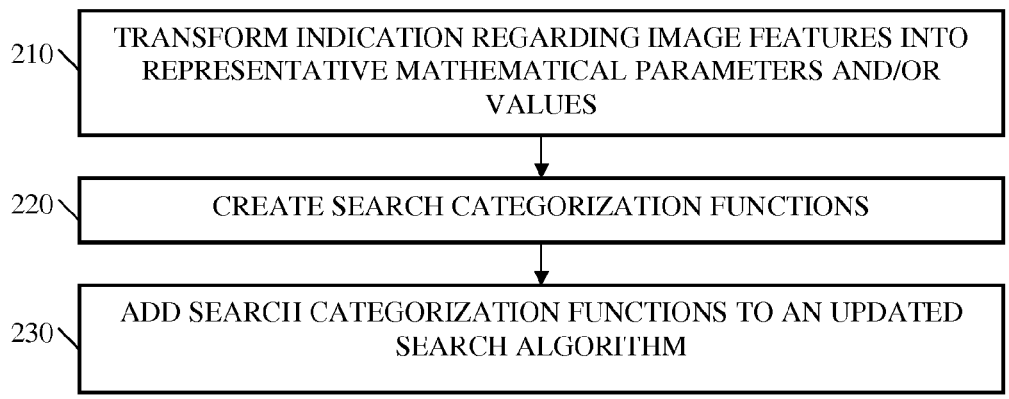
FIG. 2 is a flow-chart illustrating a method for creating an updated search algorithm for searching for images which include similar and/or identical features to features indicated by a user, according to embodiments of the present invention.

Reference is now made to FIG. 2, which is a flow-chart illustrating a method for creating an updated search algorithm for searching for images which include similar and/or identical features to features indicated by a user and/or included in images indicated by a user, according to embodiments of the present invention. In some embodiments of the present invention, as shown in block 210, the received indication regarding images and/or image feature(s) may be transformed, for example, translated and/or coded into representative mathematical parameters and/or values, for example, by image processing methods and/or tools. In case the received indications are about binary or multilevel relevancy/suitability of the indicated image(s)/portion(s), the transformation may first include identification of features in the indicated images/ portions of images, for example by the image processing tools/methods, such as a shape, background and/or colors. Then, the identified features may be transformed into representative mathematical parameters and/or values. In case the received indications are about specific features of the indicated image(s)/portion(s), the specific features may be identified and then transformed into representative mathematical parameters and/or values.

Below is an example of an algorithm implementation—for the illustration of the above. Consider data points, received after current stage of performing regular image search of the form: $\{(X[1], y[1]), (X[2], y[2]), \ldots, (X[n], y[n])\}$ where the y[i] is either 1 or −1—this label denotes the class to which the point X[i] belongs—label 1 means, that document belongs for class "suitable" for current feature Each of X[i] is a n dimensional vector of SIFT descriptor values. This set may be considered as training data, which denotes the correct classification which the algorithm is eventually required to distinguish. The training is really followed for Find Similar (Relevance Feedback) Algorithm solving: to calculate weights a[i,j] of single descriptors. Given two images and their corresponding SIFT descriptor vectors we define the similarity between two images simply as the number interest points shared between two images. The interest points are defined as "shared" when a pair of interest points (one from each image) has a L2 distance of below certain threshold. Geometric post processing steps are also used to remove the outlier matches. For each non-marked document X it is calculated the its a value y(X) is calculated by $y(X)=\Sigma a[i,j]*y[i]*(X, X[i])+w$. If $y(X)>=0$, the non-marked image X is recognized as "Suitable", otherwise as "Non-Suitable". It is necessary to note, that the above description is only a particular example of an image recognition technique that may be employed.

The image processing tools/methods may include at least one of the following tools/methods: image pixel vectors categorization, Gabor filter, Fourier Descriptor, Wavelet transform, Scale-Invariant Feature Transform (SIFT), Speeded Up Robust Features (SURF), and/or any other suitable tool/method.

Based on the resulted mathematical parameters and/or values, which represent the indications regarding images and/or specific image features identified by a user as described above, as shown in block 220, search categorization functions may be created, which may be added to an updated search algorithm. Based on the created categorization functions, the updated search algorithm may search for images which include similar and/or identical features to the features indicated by the user and/or included in images indicated by a user. In order to create the search categorization functions, computational learning tools/methods may be utilized to, for example, formulate general rules based on the user identification of desired image features and/or of images including desired features, translated into mathematical parameters and/or values. Additionally, the computational learning tools/methods may be utilized to, for example, formulate general rules based on the indicated relevancy/suitability level of indicated image(s)/portion(s), or of indicated features, if applicable. The formulated rules may be employed in the search categorization functions. The computational learning tools/methods may include at least one of the following tools/methods: Support Vector Machine (SVM), Least Squares SVM (LS-SVM), one-class SVM, relevance feedback algorithms, logistic regression algorithms, neural networks, decision trees, Bayesian networks, and/or any other suitable tool/method. Additionally, the search categorization functions may include a threshold to distinguish between suitable and non-suitable images/features, for example, based on a required similarity level indicated by the user. The threshold may also be determined by the computational learning tools/methods mentioned above.

As mentioned above, as shown in block 230, the created search categorization functions may be added to an updated search algorithm, which may enable image search based on the content of the images and thus, for example, obtaining an updated collection of images based on the user indication of desired images/features. Then, an updated collection of images may be provided by using the updated search algorithm.

In one exemplary embodiment, a user may mark an image, a portion of an image or a spot in the image with a marker which identifies the image, the portion or the spot as including a suitable color/color spectrum to the user's requirements. Different markers may be used for marking the whole image, a portion of the image or a spot in the image. As described above with reference to block 210, the indicated color spectrum may be transformed into representative mathematical parameters and/or values, for example, by an image processing tool. For example, the image processing tool may identify the color spectrum included in the marked image or portion of an image. Then, the same or another image processing tool may translate and/or code the identified color spectrum into representative mathematical parameters and/or values. Based on the resulted mathematical parameters and/or values, as shown in block 220, search categorization functions may be created, which may be added to an updated search algorithm as shown in block 230. Based on the created categorization functions, the updated search algorithm may search for images which include similar and/or identical color spectrum to the color spectrum indicated by the user.

In another exemplary embodiment, a user may mark an image or a portion of an image with a marker which identifies the image or the portion as including an item(s)/shape(s)/shape edge(s) which is/are suitable to the user's requirements. As described above with reference to block 210, the indicated item/shape may be transformed into representative mathematical parameters and/or values, for example, by an image processing tool. For example, the image processing tool may identify a shape/item, for example by detecting edges of a shape included in the marked image or portion of an image. Then, the same or another image processing tool may translate and/or code the identified shape into representative mathematical parameters and/or values. Based on the resulted mathematical parameters and/or values, as shown in block 220, search categorization functions may be created, which may be added to an updated search algorithm as shown in block 230. Based on the created categorization functions, the updated search algorithm may search for images which include similar and/or identical item(s)/shape(s)/shape edge(s) to the item(s)/shape(s)/shape edge(s) indicated by the user.

In some embodiments, the user may mark one or several spots on the image with a marker for identifying the spots or points and their relative location in the image. Then, the identification of the spots or points and their relative locations may be translated and/or coded into representative mathematical parameters and/or values, for example, by an image processing tool as shown in block 210. Based on the resulted mathematical parameters and/or values, as shown in block 220, search categorization functions may be created, which may be added to an updated search algorithm as shown in block 230. Based on the created categorization functions, the updated search algorithm may search for images which include similar and/or identical spots in the identified relative locations as identified by the user.

Figure 3:
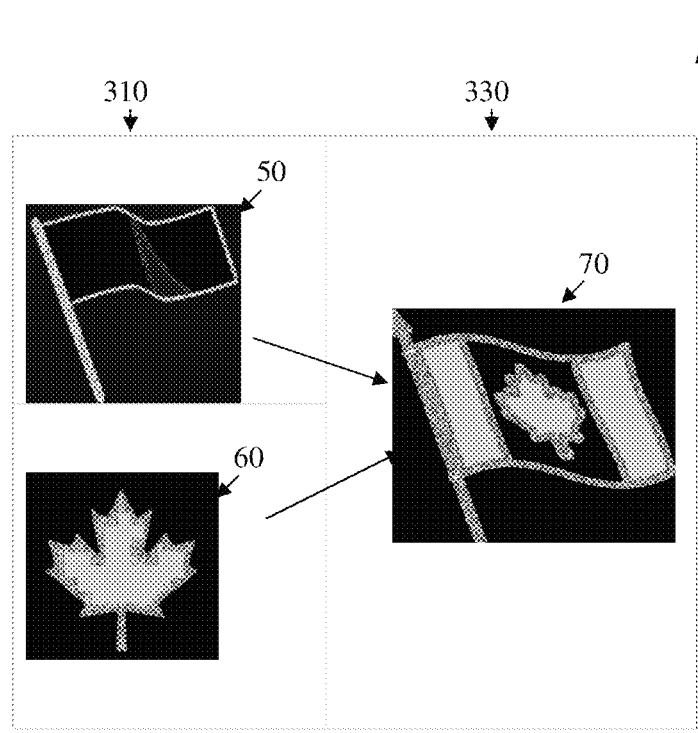
FIG. 3 is a table illustrating a method for image search according to embodiments of the present invention.

In some embodiments of the present invention, user indications of several different images may be used in order to search for images which include a combination of features included in the indicated images. Reference is now made to FIG. 3, which is a table 300 illustrating a method for image search according to embodiments of the present invention. Column 310 and 330 show three stages of the methods. Images 50 and 60 shown in column 310 may be included in a larger collection of images not fully shown in table 300 and may be indicated by a user as relevant or as having an extent of relevancy to the user requirements/needs. As shown in column 330, for example, by the methods described in detail above with reference to FIGS. 1 and 2, image 70 may be retrieved, which may include a combination of features included in the indicated images 50 and 60.

Figure 4:
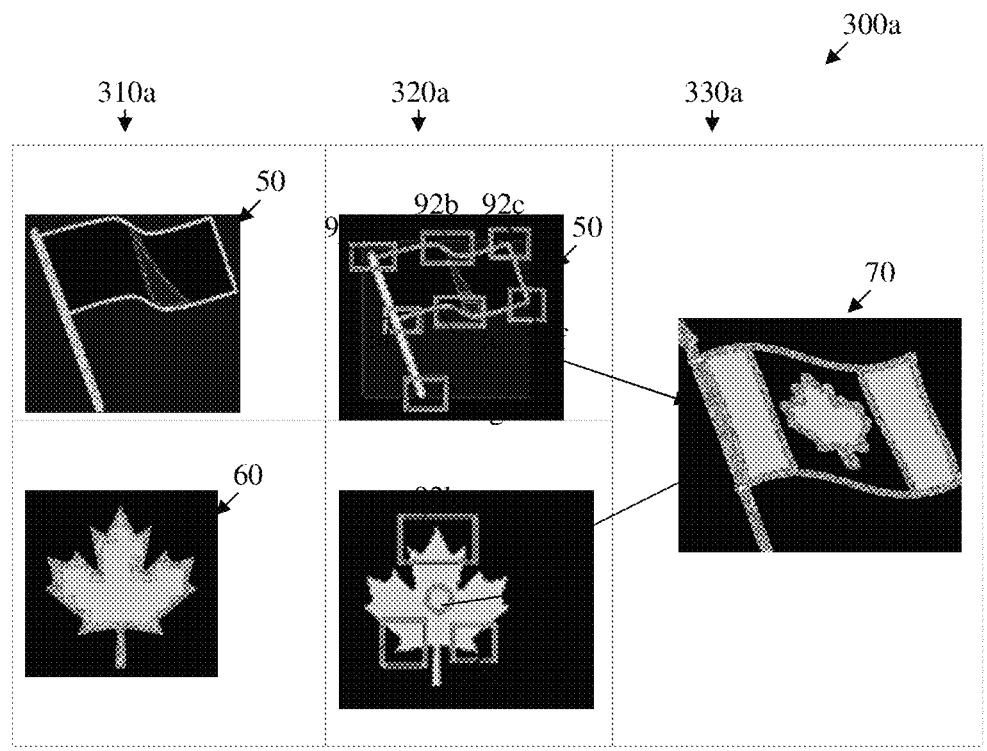
FIG. 4 is a table illustrating a method for image search according to embodiments of the present invention.

In some embodiments of the present invention, user indications of different features, for example, in several different images, may be combined in order to search for images which include the combination of the indicated features. Reference is now made to FIG. 4, which is a table 300a illustrating a method for image search according to embodiments of the present invention. Column 310a, 320a and 330a show three stages of the methods. Images 50 and 60 shown in column 310a may constitute a collection of images or may be included in a larger collection of images not fully shown in table 300a. As shown in column 320a, a user may indicate by markers 92a-92g shape edges in image 50 which may define a requested shape in image 50, for example, a shape of a flag. By markers 92h-92j, the user may indicate shape edges in image 60, which may define a requested shape in image 60, for example of a maple leaf. By a marker 94, the user may indicate a requested color, for example red color. As shown in column 330a, for example, by the methods described in detail above with reference to FIGS. 1 and 2, image 70 may be retrieved, which may include the identified requested shapes from images 50 and 60 and the identified requested color from image 60.

Figure 5:
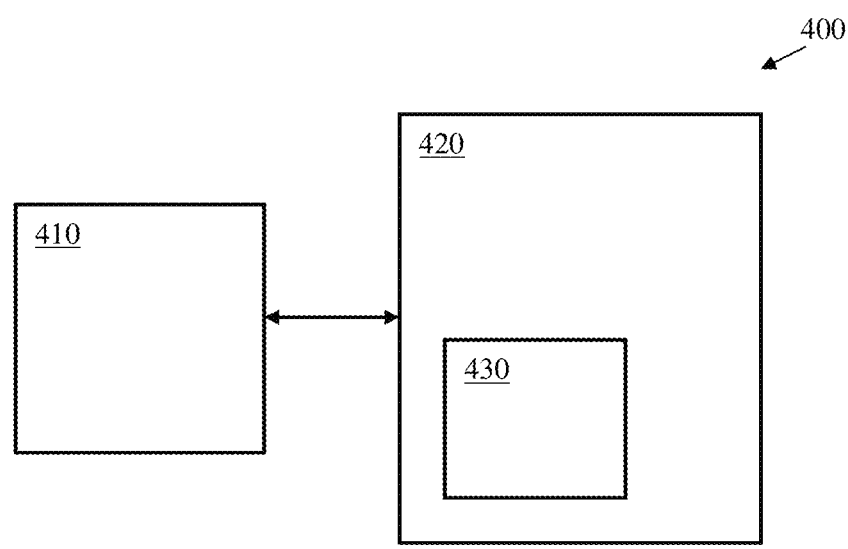
FIG. 5 is a schematic illustration of a system for image search according to embodiments of the present invention.

Reference is now made to FIG. 5 which is a schematic illustration of a system 400 for image search according to embodiments of the present invention. The methods described in detail above may be executed by system 400. System 400 may include a user interface 410, a processor 420 and a non-transitory processor-readable storage medium 430, which may store instructions for processor 420. Processor 420 may receive, for example, from user interface 410, an indication regarding at least one image or at least one feature of at least one image from a collection of images. Further to instructions which may be read from non-transitory processor-readable storage medium 430, processor 420 may create an updated search algorithm according to said indication, as described in detail above with reference to FIGS. 1-3. For example, image processing tools/methods and computational learning tools/methods may be used by processor 420 as described in detail above with reference to FIGS. 1-3, for example, further to instructions which may be read from non-transitory processor-readable storage medium 430. By the updated search algorithm, processor 420 may provide to the user an updated collection of images, for example, further to instructions which may be read from non-transitory processor-readable storage medium 430.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for image search comprising:
   (a) providing an initial large collection of images;
   (b) providing a first sub-set of images from said large collection;
   (c) creating a search algorithm;
   (d) receiving from a user an indication regarding level of relevancy of at least two features of at least one image from the sub-set of images, and a similarity level for each of the at least two features;
   (e) calculating updated values of control parameters of the search algorithm according to said indication, wherein the control parameters comprise a threshold to distinguish between suitable and non-suitable images and features of images and weights of descriptors;
   using the search algorithm for:
   (f) providing a next batch of images from said large collection which does not include images included in previous batches of images; and
   (g) providing a next sub-set of images by searching said next batch of images using said search algorithm, wherein the search algorithm is configured to distinguish between suitable and non-suitable images and features of images by implementing the updated control parameters; and
   (h) repeating items (d)-(g) until additional refining of the image search is not required by the user.

2. A method according to claim 1, wherein calculating updated values of control parameters of said search algorithm comprises:
   transforming the indication regarding at least two features into representative mathematical parameters;
   creating search categorization functions based on the mathematical parameters; and
   adding the created search categorization functions an updated search algorithm.

3. A method according to claim 1, wherein the threshold is created based on the required similarity level indicated by the user.

4. A method according to claim 1, wherein receiving an indication regarding at least two features of at least one image comprises receiving an indication regarding the level of one or more from a list comprising relevancy and suitability of at least one of image or at least two features of at least one image.

5. A method according to claim 4, wherein the indication regarding the level of at least one from the list comprising relevancy and suitability of at least one image or at least two features of at least one image is by means of binary indication.

6. A method according to claim 5, wherein the indication regarding the level of relevancy and suitability of at least one image or at least two features of at least one image is by means of multilevel ranking.

7. A method according to claim 1, wherein each of the at least two features is selected from: an item appearing in the image, a shape appearing in the image, a color appearing in the image and a spectrum of colors appearing in the image.

8. A non-transitory processor-readable storage medium having instructions stored thereon that, when executed by a processor, cause the processor to perform the steps of:
   (a) providing an initial large collection of images;
   (b) providing a first sub-set of images from said large collection;
   (c) creating a search algorithm;
   (d) receiving an indication regarding level of relevancy of at least two features of at least one image from the sub-set of images, and a similarity level for each of the at least two features;
   (e) updating the search algorithm according to said indication, by calculating updated values of control parameters, wherein the control parameters comprise a threshold to distinguish between suitable and non-suitable images and features of images and weights of descriptors;
   using the search algorithm for:
   (f) providing a next batch of images from said large collection which does not include images included in previous batches of images; and
   (g) providing a next sub-set of images by searching said next batch using the updated search algorithm, wherein the updated search algorithm is configured to distinguish between suitable and non-suitable images and features of images by implementing the updated control parameters; and
   (h) repeating items (d)-(g) until additional refining of the image search is not required by the user.

9. The non-transitory processor-readable storage medium according to claim 8, wherein said instructions stored thereon cause the processor to perform the further steps of:
   transforming the indication regarding at least two features into representative mathematical parameters;
   creating search categorization functions based on the mathematical parameters; and
   adding the created search categorization functions an updated search algorithm.

10. The non-transitory processor-readable storage medium according to claim 8, wherein said instructions stored thereon cause the processor to perform the further steps of:
   receiving an indication regarding the level of relevancy and suitability of at least one of image or at least two features of at least one image.

11. The non-transitory processor-readable storage medium according to claim 8, wherein each of the at least two features is selected from: an item appearing in the image, a shape appearing in the image, a color appearing in the image and a spectrum of colors appearing in the image.

\* \* \* \* \*